United States Patent
Yang et al.

(10) Patent No.: US 8,150,903 B2
(45) Date of Patent: Apr. 3, 2012

(54) RECONFIGURABLE ARITHMETIC UNIT AND HIGH-EFFICIENCY PROCESSOR HAVING THE SAME

(75) Inventors: Yil Suk Yang, Daejeon (KR); Jung Hee Suk, Daejeon (KR); Chun Gi Lyuh, Daejeon (KR); Tae Moon Roh, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 967 days.

(21) Appl. No.: 12/136,107

(22) Filed: Jun. 10, 2008

(65) Prior Publication Data
US 2009/0150471 A1 Jun. 11, 2009

(30) Foreign Application Priority Data
Dec. 5, 2007 (KR) .................... 10-2007-0125348

(51) Int. Cl.
*G06F 7/57* (2006.01)
(52) U.S. Cl. ........................................... 708/625
(58) Field of Classification Search .................. None
See application file for complete search history.

(56) References Cited

U.S. PATENT DOCUMENTS

| | | | | |
|---|---|---|---|---|
| 5,974,435 | A * | 10/1999 | Abbott | 708/523 |
| 6,519,621 | B1 * | 2/2003 | Yano | 708/603 |
| 6,625,740 | B1 | 9/2003 | Datar et al. | |
| 6,760,832 | B2 | 7/2004 | Nishimoto et al. | |
| 8,019,805 | B1 * | 9/2011 | Sarma | 708/627 |
| 2005/0076074 | A1 * | 4/2005 | Horie | 708/700 |
| 2006/0004903 | A1 * | 1/2006 | Admon | 708/708 |
| 2006/0064455 | A1 * | 3/2006 | Schulte et al. | 708/708 |
| 2008/0243976 | A1 * | 10/2008 | Wiencke | 708/230 |

FOREIGN PATENT DOCUMENTS

| | | |
|---|---|---|
| KR | 10-0324313 B1 | 1/2002 |
| KR | 1020060011387 A | 2/2006 |
| KR | 1020060122520 | 11/2006 |

* cited by examiner

*Primary Examiner* — David H Malzahn
(74) *Attorney, Agent, or Firm* — Ladas & Parry LLP

(57) ABSTRACT

Provided are a reconfigurable arithmetic unit and a processor having the same. The reconfigurable arithmetic unit can perform an addition operation or a multiplication operation according to an instruction by sharing an adder. The reconfigurable arithmetic unit includes a booth encoder for encoding a multiplier, a partial product generator for generating a plurality of partial products using the encoded multiplier and a multiplicand, a Wallace tree circuit for compressing the partial products into a first partial product and a second partial product, a first Multiplexer (MUX) for selecting and outputting one of the first partial product and a first addition input according to a selection signal, a second MUX for selecting and outputting one of the second partial product and a second addition input according to the selection signal, and a Carry Propagation Adder (CPA) for adding an output of the first MUX and an output of the second MUX to output an operation result. The arithmetic unit can operate as an adder or a multiplier according to an instruction, and thus can increase the degree of use of entire hardware.

9 Claims, 4 Drawing Sheets

RECONFIGURABLE ARITHMETIC UNIT AND HIGH-EFFICIENCY PROCESSOR HAVING THE SAME

CROSS-REFERENCE TO RELATED APPLICATION

This application claims priority to and the benefit of Korean Patent Application No. 2007-125348, filed Dec. 5, 2007, the disclosure of which is incorporated herein by reference in its entirety.

BACKGROUND

1. Field of the Invention

The present invention relates to a reconfigurable arithmetic unit and a processor having the same, and more particularly, to a reconfigurable arithmetic unit capable of performing an addition operation or a multiplication operation according to an instruction by sharing an adder, and a high-efficiency processor having the reconfigurable arithmetic unit.

This work was supported by the IT R&D program of MIC/IITA. [2006-S-006-02, Components/Module technology for Ubiquitous Terminals].

2. Discussion of Related Art

A datapath is a very important block for operations and signal processing, and determines performance of a processor, e.g., a Microprocessor Unit (MPU), a Microcontroller Unit (MCU) or a Digital Signal Processor (DSP). The datapath performs successive operations of processing data and reading/writing the processed data by fetching, decoding and executing an instruction.

Meanwhile, energy efficiency of a processor is generally calculated to be performance/total power, that is, calculated by dividing the data processing capability of the processor by power consumption. Here, Millions of Instructions Per Second (MIPS)/mW are generally used as the unit of energy efficiency. As a general unit indicating performance, MIPS denote How many millions of instructions can be processed per second. According to the above definition of energy efficiency, the energy efficiency of a processor increases with improvement in the performance of the processor and reduction in power consumption.

FIGS. 1A to 1C are block diagrams of datapaths included in conventional processors.

Referring to FIG. 1A, a conventional datapath includes an adder 111, a multiplier 112 and a shifter 113 as function units for performing an arithmetic operation and a logic operation. The adder 111, the multiplier 112 and the shifter 113 are supplied with the same operating voltage $V_{DD}$ from a power supply 114. In a processor including the datapath having the above structure, three function units operate in parallel, and thus the processor has an excellent capability of processing instructions. However, since the three function units are constantly supplied with operating voltage, power consumption increases, and energy efficiency deteriorates.

In addition, since the function units performing an addition operation and a multiplication operation separately exist, while one function unit performs an operation, other function units do not operate. Thus, the degree of use of the entire hardware decreases.

Referring to FIG. 1B, a datapath has been proposed which performs a multiplication operation using an adder 121 without a multiplier to reduce power consumption and increase the degree of use of entire hardware. Here, the adder 121 and a shifter 122 are supplied with the same operating voltage $V_{DD}$ from a power supply 123 in the same manner as in FIG. 1A. However, the datapath having the above structure performs an addition operation several times to execute a multiplication instruction, and thus its performance deteriorates.

Referring to FIG. 1C, a method of applying different operating voltage to respective function units has been proposed to reduce power consumption while including a multiplier. Accordingly, a power supply 134 applies different operating voltages $V_{DD1}$, $V_{DD2}$ and $V_{DD3}$ to an adder 131, a multiplier 132 and a shifter 133, respectively. In addition, level converters 135 adjusting a supply voltage level are added between the adder 131 and the multiplier 132 and between the multiplier 132 and the shifter 133. However, a processor including the datapath having the above structure sometimes has lower energy efficiency than the processor of FIG. 1A because its performance deteriorates due to low operating voltage and voltage level adjustment.

SUMMARY OF THE INVENTION

The present invention is directed to providing a processor having a high degree of use of entire hardware and high energy efficiency.

One aspect of the present invention provides a reconfigurable arithmetic unit, comprising: a booth encoder for encoding a multiplier; a partial product generator for generating a plurality of partial products using the encoded multiplier and a multiplicand; a Wallace tree circuit for compressing the partial products into a first partial product and a second partial product; a first Multiplexer (MUX) for selecting and outputting one of the first partial product and a first addition input according to a selection signal; a second MUX for selecting and outputting one of the second partial product and a second addition input according to the selection signal; and a Carry Propagation Adder (CPA) for adding an output of the first MUX and an output of the second MUX to output an operation result.

Another aspect of the present invention provides a processor, comprising: an instruction decoder for decoding an instruction to generate a first control signal and a second control signal; an arithmetic unit for performing an arithmetic operation according to the first control signal; a first Dynamic Voltage Scaling Power Supply (DVSPS) for determining a level of a voltage supplied to the arithmetic unit according to the first control signal; a shifter for performing a shift operation according to the second control signal; and a second DVSPS for determining a level of a voltage supplied to the shifter according to the second control signal.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1A:
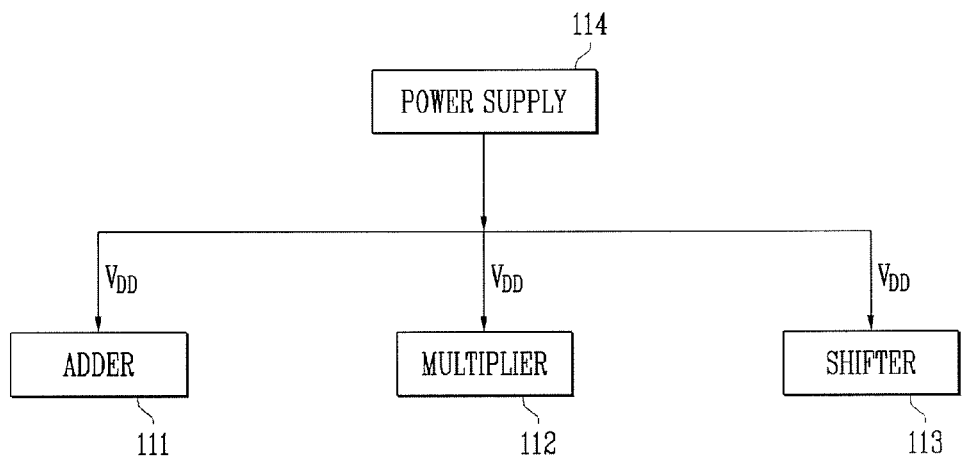
FIGS. 1A to 1C are block diagrams of datapaths included in conventional processors.
Figure 1B:
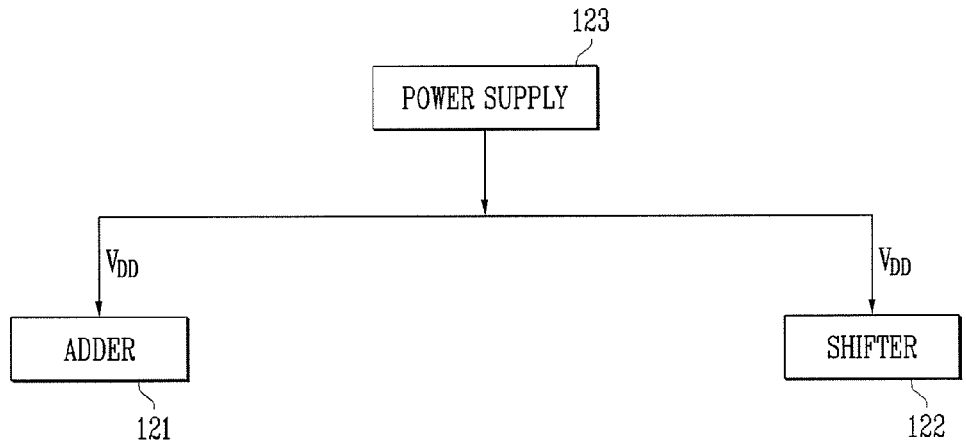
Figure 1C:
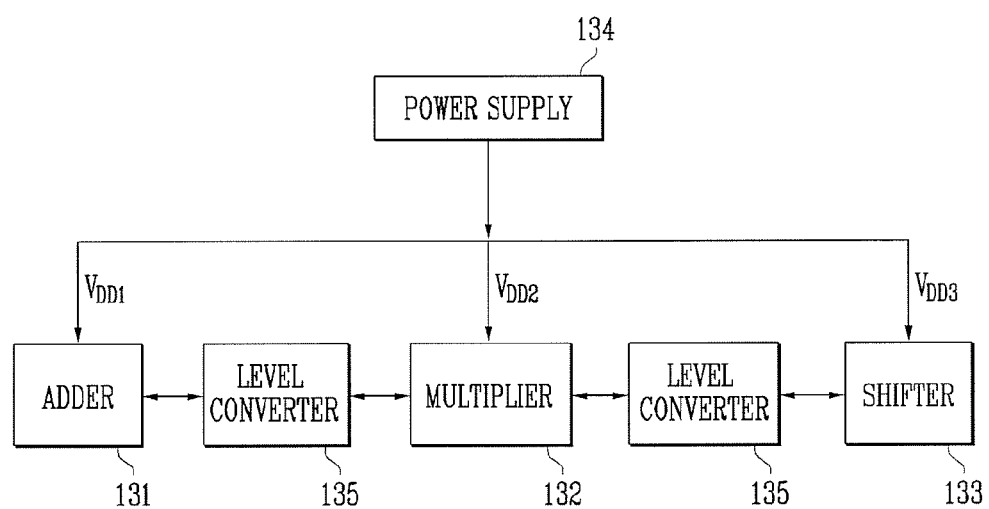
Figure 2:
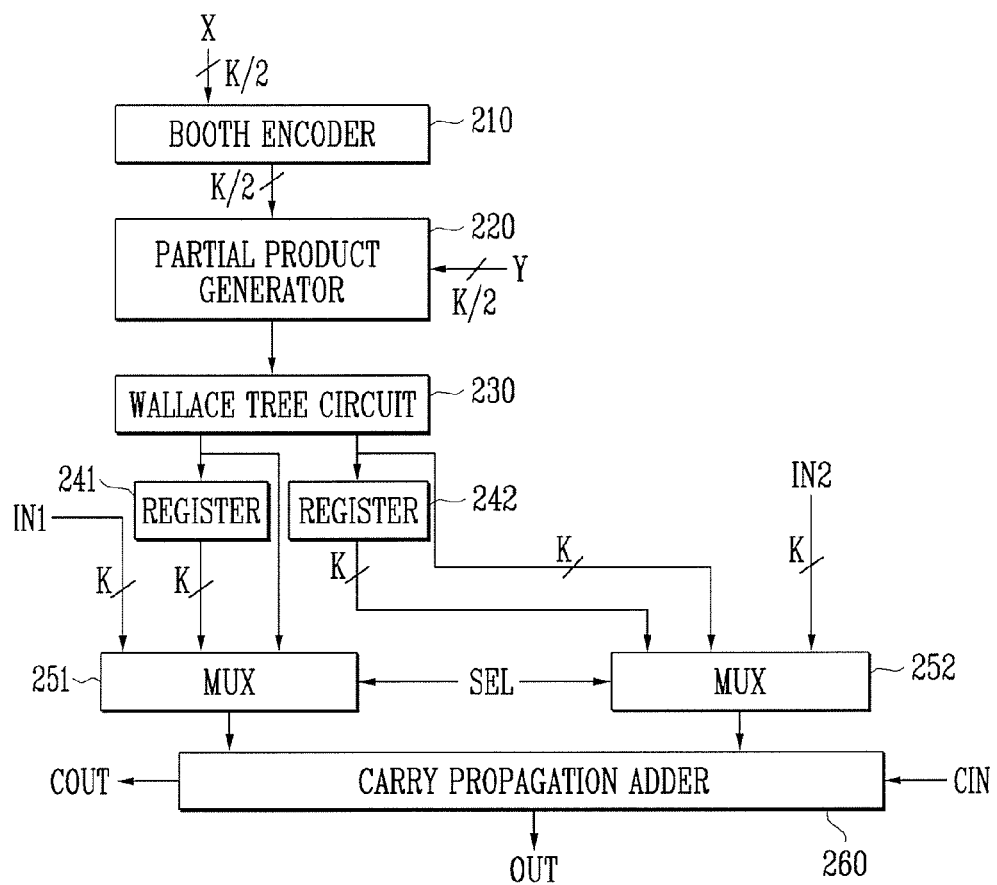
FIG. 2 is a block diagram of a reconfigurable arithmetic unit according to an exemplary embodiment of the present invention.

FIG. 2 is a block diagram of a reconfigurable arithmetic unit according to an exemplary embodiment of the present invention.

Referring to FIG. 2, the reconfigurable arithmetic unit according to an exemplary embodiment of the present invention includes a booth encoder 210, a partial product generator 220, a Wallace tree circuit 230, a first register 241, a second register 242, a first Multiplexer (MUX) 251, a second MUX 252 and a Carry Propagation Adder (CPA) 260.

In a multiplication operation, the booth encoder 210 receives a k/2-bit multiplier X, encodes the multiplier X according to a booth algorithm, and transfers the encoded multiplier to the partial product generator 220. The partial product generator 220 generates a plurality of partial products using the encoded multiplier and a k/2-bit multiplicand Y. The Wallace tree circuit 230 compresses the partial products into a first partial product and a second partial product and transfers the first and second partial products to the first and second MUXes 251 and 252. The first and second MUXes 251 and 252 output the first partial product and the second partial product according to a selection signal SEL, respectively. And, the CPA 260 sums the first and second partial products to output the result value of the multiplication operation.

In an addition operation, two k-bit addition inputs IN1 and IN2 selected by the first and second MUXes 251 and 252 are input to the CPA 260, and the CPA 260 sums the two inputs to output the result value of the addition operation.

Therefore, the first and second MUXes 251 and 252 output the first and second partial products output from the Wallace tree circuit 230 in the case of a multiplication operation, and output the addition inputs IN1 and IN2 in the case of an addition operation. In an exemplary embodiment, when addition and multiplication operations are to be simultaneously performed, the output of the Wallace tree circuit 230 is stored in the first and second registers 241 and 242, and the first and second MUXes 251 and 252 output the addition inputs IN1 and IN2, thereby performing an addition operation at a first clock. At a second clock, the first and second partial products stored in the first and second registers 241 and 242 are input to the CPA 260 through the first and second MUXes 251 and 252, and the CPA 260 sums the first and second partial products, thereby performing a multiplication operation. Consequently, it is possible to successively perform the addition operation and the multiplication operation in two clocks.

As described above, the arithmetic unit according to an exemplary embodiment of the present invention may be reconfigured by adding registers and MUXes to a conventional booth multiplier and sharing a CPA to perform the functions of an adder and a multiplier separately or simultaneously. Therefore, a processor including the arithmetic unit according to an exemplary embodiment of the present invention can improve the degree of use of entire hardware.

Figure 3:
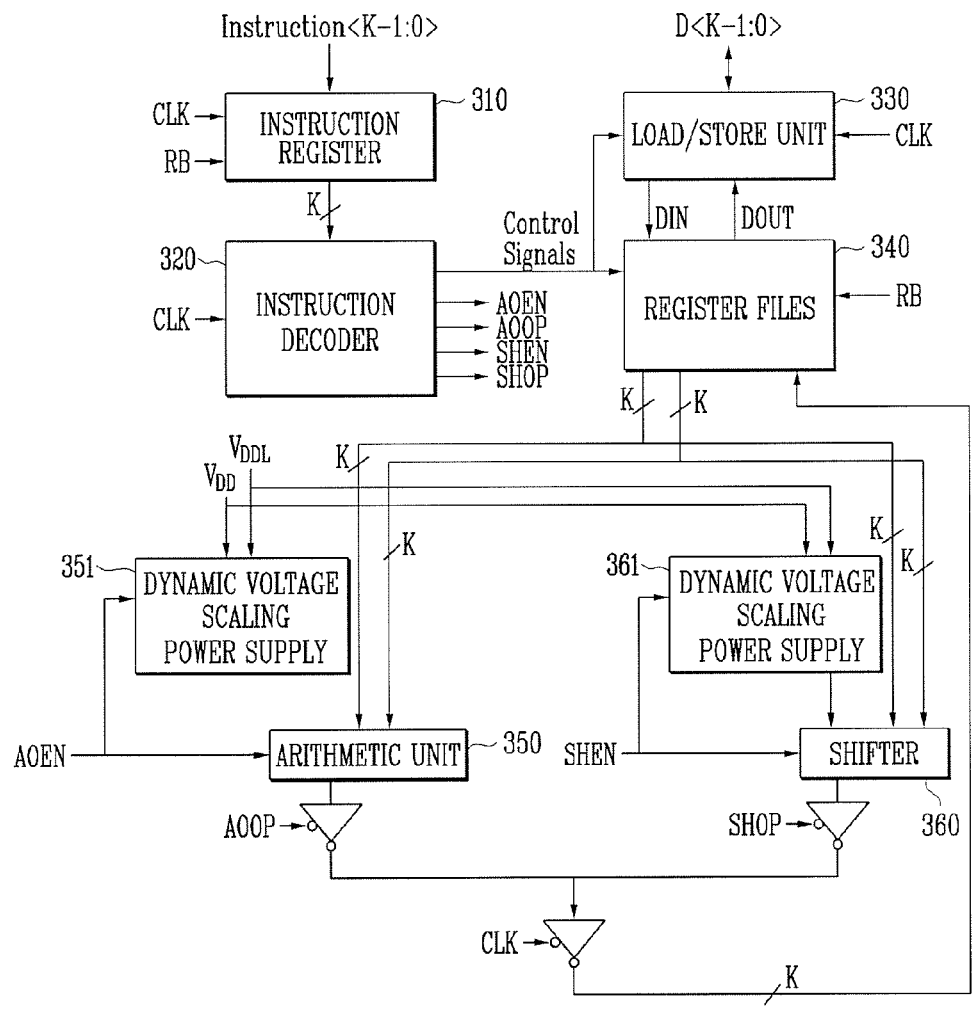
FIG. 3 is a block diagram of a high-efficiency processor according to an exemplary embodiment of the present invention.

FIG. 3 is a block diagram of a high-efficiency processor according to an exemplary embodiment of the present invention.

Referring to FIG. 3, the high-efficiency processor according to an exemplary embodiment of the present invention includes a k-bit instruction register 310, an instruction decoder 320, a load/store unit 330, register files 340, an arithmetic unit 350, a first Dynamic Voltage Scaling Power Supply (DVSPS) 351, a shifter 360 and a second DVSPS 361. The high-efficiency processor operates according to a clock signal CLK and a reset signal RB. In an exemplary embodiment, the arithmetic unit 350 has the same constitution as the arithmetic unit of FIG. 2, and may be reconfigured to perform an addition operation or a multiplication operation according to an instruction.

The instruction register 310 receives and stores a k-bit instruction, and the instruction decoder 320 receives the instruction from the instruction register 310 and generates various control signals for executing the instruction.

The register files 340 consist of a plurality of registers. According to a control signal, the register files 340 select and control a register required for providing data necessary for executing the instruction or storing data resulting from executing the instruction. Here, the register files 340 may read the required data from an external memory (DIN) or store the result data in an external memory through the load/store unit 330 (DOUT).

According to control signals AOEN and SHEN generated from the instruction decoder 320, the arithmetic unit 350 and the shifter 360 perform an operation using the data provided from the register files 340, and the operation result is transferred to the register files 340 according to control signals AOOP and SHOP and the clock signal CLK. Here, a voltage applied to the arithmetic unit 350 and the shifter 360 is controlled by the first and second DVSPSes 351 and 361. The DVSPSes denote power supplies capable of changing an output voltage from an operating voltage $V_{DD}$ to a sleep voltage $V_{DDL}$ having a lower level than the operating voltage $V_{DD}$, or vice versa, according to control signals.

The first and second DVSPSes 351 and 361 operate according to the control signals AOEN and SHEN generated from instruction decoder 320. For example, the first DVSPS 351 outputs the operating voltage $V_{DD}$ when the control signal AOEN is high, and outputs the sleep voltage $V_{DDL}$ when the control signal AOEN is low. In the same way, the second DVSPS 361 outputs the operating voltage $V_{DD}$ when the control signal SHEN is high, and outputs the sleep voltage $V_{DDL}$ when the control signal SHEN is low.

According to this principle, when the instruction decoder 320 outputs the control signals AOEN and AOOP having a high level, to perform an addition operation or a multiplication operation depending on an instruction, the operating voltage $V_{DD}$ is applied to the arithmetic unit 350, and an addition operation or a multiplication operation can be performed. At the same time, the sleep voltage $V_{DDL}$ is applied to the shifter 360 that does not operate, such that power consumption can be reduced. In the same way, when the control signals SHEN and SHOP having a high level are applied to perform a shift operation, the operating voltage $V_{DD}$ is applied only to the shifter 360. In other words, it is possible to reduce power consumption without deteriorating performance by applying the operating voltage $V_{DD}$ to a function unit required for executing an instruction and the sleep voltage $V_{DDL}$ to a function unit not performing an operation. Therefore, the high-efficient processor of the present invention can reduce power consumption while having the same performance as a processor using a single operating voltage, and thus has high energy efficiency. In addition, since the high-efficient processor uses a reconfigurable arithmetic unit, it is possible to increase the degree of use of entire hardware.

The present invention provides an arithmetic unit capable of operating as an adder or a multiplier according to an instruction and thus can increase the degree of use of entire hardware.

In addition, the present invention provides a processor reducing power consumption by applying an operating voltage to a function unit that performs an operation and a sleep voltage to a function unit that does not operate according to an instruction, and thus can increase energy efficiency of the processor.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A reconfigurable arithmetic unit, comprising:
   a booth encoder for encoding a multiplier;
   a partial product generator for generating a plurality of partial products using the encoded multiplier and a multiplicand;
   a Wallace tree circuit for compressing the partial products into a first partial product and a second partial product;
   a first Multiplexer (MUX) for selecting and outputting one of the first partial product and a first addition input according to a selection signal;
   a second MUX for selecting and outputting one of the second partial product and a second addition input according to the selection signal; and
   a Carry Propagation Adder (CPA) for adding an output of the first MUX and an output of the second MUX to output an operation result.

2. The reconfigurable arithmetic unit of claim 1, further comprising:
   a first register for storing the first partial product compressed by the Wallace tree circuit; and
   a second register for storing the second partial product compressed by the Wallace tree circuit.

3. The reconfigurable arithmetic unit of claim 2, wherein the first MUX outputs the first partial product stored in the first register according to the selection signal, and the second MUX outputs the second partial product stored in the second register according to the selection signal.

4. A processor, comprising:
   an instruction decoder for decoding an instruction to generate a first control signal and a second control signal;
   an arithmetic unit for performing an arithmetic operation according to the first control signal;
   a first Dynamic Voltage Scaling Power Supply (DVSPS) for determining a level of a voltage supplied to the arithmetic unit according to the first control signal;
   a shifter for performing a shift operation according to the second control signal; and
   a second DVSPS for determining a level of a voltage supplied to the shifter according to the second control signal,
   wherein the arithmetic unit comprises a booth encoder for encoding a multiplier, a partial product generator for generating a plurality of partial products using the encoded multiplier and a multiplicand, a Wallace tree circuit for compressing the partial products into a first partial product and a second partial product, a first Multiplexer (MUX) for selecting and outputting one of the first partial product and a first addition input according to a selection signal, a second MUX for selecting and outputting one of the second partial product and a second addition input according to the selection signal and a Carry Propagation Adder (CPA) for adding an output of the first MUX and an output of the second MUX to output an operation result.

5. The processor of claim 4, wherein the voltage supplied to the arithmetic unit and the shifter include an operating voltage and a sleep voltage lower than the operating voltage.

6. The processor of claim 5, wherein when the first control signal is a control signal for operating the arithmetic unit, the first DVSPS determines the operating voltage as the level of the voltage supplied to the arithmetic unit.

7. The processor of claim 5, wherein when the first control signal is not a control signal for operating the arithmetic unit, the first DVSPS determines the sleep voltage as the level of the voltage supplied to the arithmetic unit.

8. The processor of claim 5, wherein when the second control signal is a control signal for operating the shifter, the second DVSPS determines the operating voltage as the level of the voltage supplied to the shifter.

9. The processor of claim 5, wherein when the second control signal is not a control signal for operating the shifter, the second DVSPS determines the sleep voltage as the level of the voltage supplied to the shifter.

* * * * *